United States Patent Office 3,442,658
Patented May 6, 1969

3,442,658
METHOD OF PROCESSING VEGETABLE FOOD PRODUCT OF CHIP FORM
George K. Okumura, 3151 S. Elm Ave., Fresno, Calif. 93706, and Jack E. Wilkinson, 2411 Divisadero, Fresno, Calif. 93701
No Drawing. Filed Apr. 5, 1965, Ser. No. 445,776
Int. Cl. A23l 1/10, 1/00
U.S. Cl. 99—83                                               6 Claims

ABSTRACT OF THE DISCLOSURE

Preparation of a crisp, crunchy protein containing food product by adding a curd derived from sprouted soy beans to gluten flour to form a dough followed by shaping and deep-fat frying of the shaped product.

---

This invention relates to food products of chip form such as potato chips, corn chips, etc. and has as its general object to provide an improved food product of this general class, especially characterized by a high protein content.

A specific object is to provide an improved method of processing such a high protein food product.

Toward the attainment of these general objects, the invention provides a food product:

(1) Of "chip form" having a high protein content;
(2) Of exceedingly pleasant taste;
(3) Including gluten and soy derivatives for protein;
(4) Combining the gluten and the soy ingredients so as to provide adequate binder properties in the dough from which the chips are made;
(5) Attaining high protein concentration by the addition of a high protein extract of soy bean;
(6) Utilizing another soy extract for intensified binder properties;
(7) Utilizing another ingredient for partially masking the characteristic soy taste so as to attain added pleasant flavor;
(8) Utilizing proportioning and blending of ingredients such as to attain an edible chip structure of a high degree of enduring crispness combined with a low-crumbling factor and an extremely pleasant taste characteristic, and, in addition, a very attractive appearance;
(9) Utilizing an extract of soy bean with all of its vitamin content retained;
(10) Prepared by a process:

(a) wherein the soy bean ingredient is prepared in the form of a soy curd precipitated from soy milk which has been extracted from a soy slurry developed from sprouted or soaked soy beans;
(b) wherein the precipitation of the soy curd is proceeded with immediately after the completion of the grinding of the sprouted or soaked soy beans with their full moisture content preserved;
(c) wherein the gluten is added in the form of dry flour which absorbs a substantial portion of the moisture of the soy curd so as to develop a satisfactorily workable dough;
(d) wherein dehydrated onion is added to the mixture to develop the function of masking the objectionable characteristic of soy bean taste;
(e) wherein the ingredients are blended and kneaded in a dough mixture to develop a dough that can be rolled satisfactorily into ribbon form from which the chips are developed;
(f) wherein the dough is first formed into balls of selected size for satisfactory handling in a noodle-rolling machine;
(g) wherein the rolling is developed in a series of several passes in which the thickness of the ribbon is reduced successively until satisfactory thickness is attained;
(h) wherein fat is added to the mixture of ingredients by absorption in a deep fat frying vat;
(i) wherein unpleasant soy bean taste is largely eliminated by a preliminary sprouting of the beans in preparation for grinding them into a slurry.

Other objects will become apparent in the ensuing specifications and claims.

The food product of our invention utilizes, as its main body ingredients, gluten flour (about 41% protein); fat (cooking oil); and a soy curd extracted from ground sprouted soy beans. In one form of the invention, for added protein concentration, a substantial additional portion of the body of the product is provided by Promine, which is a highly concentrated protein extract of soy bean. The Promine (the trade name of Central Soy of Chicago, Illinois) is a 97% protein derivative of soy beans, with the starch of the beans eliminated. In essence, the Promine is the protein content of the soy bean.

The soy curd is prepared as a precipitated extract from soy milk which in turn has been extracted from a cooked soy bean slurry derived from the grinding of sprouted soy beans, or soy beans that have been soaked until substantially maximum water absorption has been attained. Where Promine is not used, a portion of the moisture content of the soy curd is removed by a suitable absorption or extraction step. Where the Promine is used, the percentage of soy curd is reduced, and the soy bean curd is utilized in a relatively moist state so as to provide moisture for mixture with the dry Promine material.

In one form of the invention, in lieu of the soy curd, chemically precipitated, we can use a soy curd precipitated from the soy milk by bacterial action of the lactobacillus acidolphulus (the normal milk-souring bacillus as used in the manufacture of cheese). This provides a novel cheese-like flavor in the soy curd and a resultant variant in the final chip product which has a pleasant taste somewhat different from that of the product as prepared from chemically precipitated soy curd.

The several ingredients, all or some of which are utilized in the examples hereinafter given, have the following functions:

Gluten flour—for binder and protein content;
Soy curd—for protein, vitamin and water content;
Fat (e.g. cooking oil)—for carbohydrate content and taste;
Yeast—for vitamin and protein content and for improvement of taste. The yeast is an inactive yeast and does not produce any rising effect in the dough;
Onion powder, dehydrated—for masking the objectionable characteristics of soy taste;
Lecithin, derived from soy bean—for emulsification and binding action. Lecithin is utilized in the minimum quantity required for improving the binding characteristics. It functions to add miscibility to the fat and water ingredients of the mixture so that the resulting emulsification in itself provides binding characteristics;
Salt and sugar—for taste and carbohydrate content. The sugar may be a white sugar. Salt and sugar are utilized in proportions selected for development for the best flavor;
MSG (mono-sodium glutamate)—for accenting the flavor. The MSG likewise is utilized in a selected proportion in the minimum quantity necessary for obtaining the desired accent.

The aggregate protein content of the product after deep frying is approximately 30% (in the range of 28%–35%).

Our improved food product, in several different forms thereof, may be in accordance with the following examples:

EXAMPLE I

Gluten flour—250 parts by weight.
Soy curd (in the moist condition)—100 parts by weight.
Fat (cooking oil) the amount absorbed in frying.
Promine—50 parts by weight.
Yeast—50 parts by weight.
Dehydrated Onion—5 parts by weight.
Salt—15 parts by weight.
Sugar—70 parts by weight.
Lecithin—8 parts by weight.

Approximate ratio of gluten flour, soy curd, Promine, onion, salt, sugar and lecithin—25:10:5:5:0.5:1.5:7:0.8.

EXAMPLE II

Gluten flour—250 parts by weight.
Soy curd (containing less than 50% moisture)—150 parts by weight.
Fat (cooking oil)—as absorbed in frying.
Yeast—50 parts by weight.
Dehydrated Onion—5 parts by weight.
Salt—15 parts by weight.
Sugar—70 parts by weight.
Lecithin—8 parts by weight.

Approximate ratio of gluten flour, soy curd, yeast, onion, salt, sugar and lecithin—25:15:5:0.5:1.5:7:0.8.

EXAMPLE III

Gluten flour—300 parts by weight.
Soy curd—100 parts by weight.
Fat (cooking oil) as absorbed in frying.
Promine—50 parts by weight.
Yeast—50 parts by weight.
Dehydrated Onion—5 parts by weight.
Salt—15 parts by weight.
Sugar—70 parts by weight.
Lecithin—8 parts by weight.

Approximate ratio of gluten flour, soy curd, Promine, yeast, onion, salt, sugar and lecithin—30:10:5:5:0.5:1.5:7:0.8.

EXAMPLE IV

Gluten flour—250 parts by weight.
Soy curd (precipitated by bacterial action of lacto-bacillus acidolphulus)—100 parts by weight.
Promine—50 parts by weight.
Fat (cooking oil) the amount absorbed in frying.
Yeast—50 parts by weight.
Dehydrated Onion—5 parts by weight.
Salt—15 parts by weight.
Sugar—70 parts by weight.
Lecithin—8 parts by weight.

Approximate ratio of gluten flour, soy curd, Promine, yeast, onion, salt, sugar and lecithin—25:10:5:5:0.5:1.5:7:0.8.

EXAMPLE V

Gluten flour—200 parts by weight.
Soy bean curd—100 parts by weight.
Fat (cooking oil) as absorbed in frying.
Promine—50 parts by weight.
Yeast—50 parts by weight.
Dehydrated onion—5 parts by weight.
Salt—15 parts by weight.
Sugar—70 parts by weight.
Lecithin—8 parts by weight.

Approximate ratio of gluten flour, soy curd, Promine, yeast, onion, salt, sugar and lecithin—20:10:5:5:0.5:1.5:7:0.8.

PROCESSING

In processing our improved food product, selected clean soy beans are spread out upon a foraminous screen or other permeable supporting surface in a layer of two to three beans depth and are sprayed every two to three hours with a fine water spray to maintain them in a fully moistened condition, with maximum absorption of water for sprouting purposes. They are processed under these conditions at a temperature of about 80° F. for a period of 2 to 3 days. The sprouting is continued until sprouts of ½ to 1½ inches are developed, when a major percentage of the characteristic soy taste will have disappeared from the sprouted beans. The sprouting step is then discontinued and the beans are immediately subjected to the grinding step described hereinafter.

As an alternative first step, the selected clean soy beans may be soaked in cold water for a period of from 8 to 12 hours until softened, and to provide maximum absorption of water which is utilized in the subsequently extracted soy curd.

As soon as the sprouting or soaking step is completed, the beans are transferred to a stone grinder wherein they are ground to particles varying in size from colloidal dimension up to discrete particle form.

This produces a soy milk from which the soy curd is extracted by precipitation. A mixture of calcium sulphate and magnesium chloride is utilized as a precipitating agent, and remains in the resulting soy curd to the extent of approximately 1/10 of 1% of the total by weight. The excess water is then removed from the precipitate, leaving the soy curd in a moist state, in the proportion of approximately 60% liquid to 40% solids. This is the moist curd that is used where Promine is added. Where Promine is not used, the moisture content is further reduced by a suitable process (e.g. by pressure extraction) to the point where the moisture content is less than 50% (e.g. approximately 40% moisture to 60% solids, by weight). The additional dry ingredients are added to the soy curd in sufficient proportion to provide a dough of proper consistency for rolling into ribbon form, and blended therewith. These ingredients include gluten flour derived from wheat and in conventional dry flour form, of 41% protein content, the remainder being starch and vitamins.

The gluten flour, Promine, yeast, flavoring ingredients, lecithin, dehydrated onion and accent ingredients are all added to the soy bean curd without the addition of water and are then blended and kneaded in a dough mixture. Blending and kneading proceeds immediately after the completion of the preparation of the soy bean curd, with its moisture content as hereinbefore defined, preserved.

As soon as the mixing is completed, the dough is formed into balls of satisfactory dimension for handling in a noodle-rolling machine. The dough balls are rolled in several passes beginning with the rolls wide open and the resulting ribbon being approximately ⅜ inches thick. The sides of the ribbon are contained by lateral guides during the rolling process, to provide a ribbon of about 4 inches width. The initial ribbon of about ⅜ inch thickness is then passed through another pair of rolls, or the same rolls after adjusting them to produce a second ribbon of approximately 3/16 of an inch thickness. The ribbon is then rolled in this second pass, with the same width maintained and with elongation in inverse proportion to the reduction in thickness. In a third or final pass of further rolling, the ribbon is reduced to 1/16 inch thickness while still maintained at the same 4 inch width, and again with an elongation inversely proportional to the thickness reduction. The second and subsequent stages of rolling can be preformed by returning the previously rolled ribbon to the same rolling machine (in which case it may be preferable to separate the ribbon into several sections sufficiently short for satisfactory handling); or the ribbon issuing from the first rolling pass can be fed into a second rolling machine operated at a sufficiently increased linear spaced to match the increase in linear speed resulting from elongation; and the ribbon issuing from the second rolling pass can be similarly fed through a third rolilng machine, with a further compensating increase in the linear speed, without interruption of the forward travel of the ribbon.

As the ribbon issues from the last rolling passed it is passed through a slitting machine (e.g. utilizing rotating cutter discs) in which it is slit into ribbons of about ¾ inch to 1 inch width, and is then passed through a cutter in which it is chopped into approximately 4 to 5 inch lengths. These short strips of dough are then dropped into a deep fat frying vat and fried to a crisp condition.

Anti-oxidants are added to the cooking fat to inhibit oxidation of the oil.

We claim:
1. A method of preparing a crisp, crunchy protein-containing food product in crisp chip form, comprising: sprouting soy beans; grinding the sprouted beans into a slurry retaining a substantial proportion of the water absorbed by the beans during sprouting; adding water to the slurry and converting it into a milk; precipitating from the milk a curd retaining a substantial portion of moisture; adding gluten flour to the curd to obtain a dough of proper consistency for rolling into ribbon form; dividing the resulting ribbon into short lengths of narrow strip; and deep-fat frying the strips.

2. The method defined in claim 1, wherein the sprouted beans are ground immediately after completion of sprouting, and wherein substantially all water absorbed in sprouting is retained in the slurry.

3. The method defined in claim 1, wherein the sprouting is continued until the sprouts have attained a length in the range of ½ to 1½ inches, whereby a major percentage of the characteristic soy taste is eliminated from the sprouted beans.

4. The method defined in claim 1, wherein the sprouting is continued until the sprouts have attained a length in the range of ½ to 1½ inches, whereby a major percentage of the characteristic soy taste is eliminated from the sprouted beans; and wherein the curd is precipitated by addition of calcium sulphate and magnesium chloride to the milk.

5. The method defined in claim 1, wherein the sprouting is continued until the sprouts have attained a length in the range of ½ to 1½ inches, whereby a major percentage of the characteristic soy taste is eliminated from the sprouted beans, and wherein the curd is precipitated by adding to the milk a culture of lacto-bacterial acidolphulus.

6. The method defined in claim 1, wherein the sprouting is continued until the sprouts have attained a length in the range of ½ to 1½ inches, whereby a major percentage of the characteristic soy taste is eliminated from the sprouted beans; and including the further step of adding dehydrated onion flakes to the slurry in an amount sufficient to mask the residual soy taste.

References Cited

UNITED STATES PATENTS

| 2,436,519 | 2/1948 | Luke | 99—83 |
| 2,795,502 | 6/1957 | Raymond | 99—83 XR |
| 3,020,162 | 2/1962 | Cunningham et al. | 99—80 |
| 3,141,776 | 7/1964 | Kaufmann et al. | 99—80 |
| 3,185,574 | 5/1965 | Gabby et al. | 99—83 XR |

FOREIGN PATENTS

| 489,127 | 7/1938 | Great Britain. |

RAYMOND N. JONES, *Primary Examiner.*

U.S. Cl. X.R.

99—98